(No Model.)

C. E. FRALICK & O. C. FODREA.
FOOT POWER ATTACHMENT FOR JOB PRINTING PRESSES.

No. 587,951. Patented Aug. 10, 1897.

Witnesses.
J. H. Harrison
Alex Anderson

Inventors.
Charles E. Fralick
Ormond C. Fodrea

THE NORRIS PETERS CO., PHOTO-LITHO., WASHINGTON, D. C.

United States Patent Office.

CHARLES E. FRALICK AND ORMOND C. FODREA, OF GRAND ISLAND, NEBRASKA; SAID FRALICK ASSIGNOR TO PENNINGTON P. FODREA, OF SAME PLACE.

FOOT-POWER ATTACHMENT FOR JOB-PRINTING PRESSES.

SPECIFICATION forming part of Letters Patent No. 587,951, dated August 10, 1897.

Application filed October 13, 1896. Serial No. 608,778. (No model.)

*To all whom it may concern:*

Be it known that we, CHARLES E. FRALICK and ORMOND C. FODREA, citizens of the United States, residing at Grand Island, in the county of Hall and State of Nebraska, have invented a new and useful Foot-Power Attachment for Job-Printing Presses, of which the following is a specification.

Our invention relates to an improvement or attachment to job-printing presses, which consists of a frame formed by uprights resting on floor or platform and brace-rods connecting top of uprights with frame of printing-press to which it is attached, said frame carrying a double-crank treadle having upon one end of the shaft a sprocket-wheel, over which runs a link belt to another sprocket-wheel upon main shaft of printing-press, whereby said printing-press is driven, the said uprights having slotted bases and said brace-rods being slotted at their outer ends, providing for adjustment toward or from the printing-press to which said frame is attached, said adjustment being to regulate the tension of link belt.

The objects of our improvement are, first, to provide an easy foot-power treadle which may be worked in a sitting position; second, by means of said sprocket-wheel being made smaller or larger the speed of the press may be diminished or increased by changing the size of said sprockets; third, to provide a means of adjustment with slotted bases of uprights and slotted ends of brace-rods instead of wheel link-belt tightener; fourth, to provide a foot-power to printing-press which will increase the speed of said press without an increase in the amount of power required to operate said press. We attain these objects by the mechanism illustrated in the accompanying drawings, in which—

Figure 1:
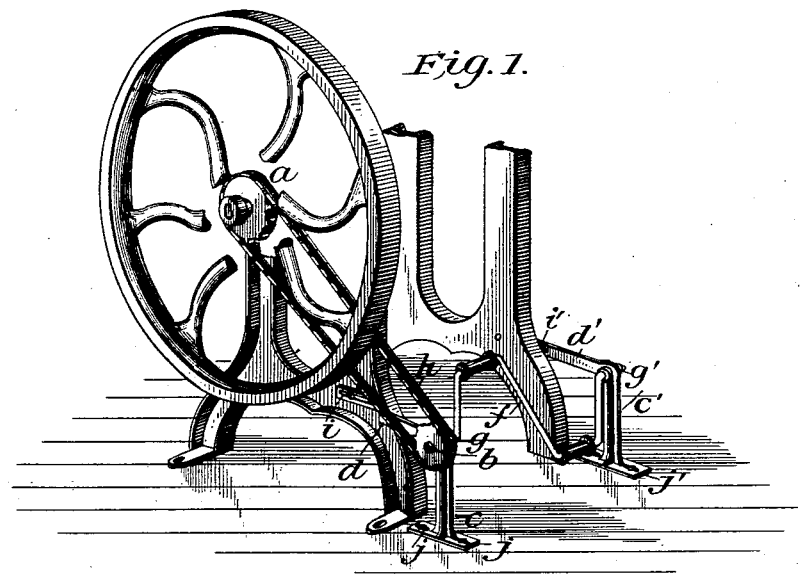
Figure 2:
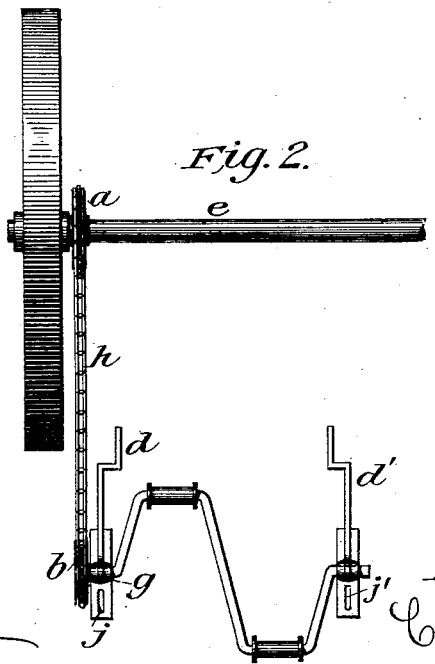

Figure 1 is a perspective view of printing-press with our improvement or attachment showing. Fig. 2 is a top view of our improvement or attachment.

Similar letters refer to similar parts throughout both views.

The frame consists of braces $d$ and $d'$, as shown, and the uprights $c$ and $c'$, having a box or bearing at $g$ and $g'$ to carry crank-shaft $f$. The braces $d$ and $d'$ are bolted to the leg or frame of printing-press, the uprights $c$ and $c'$ resting upon and bolted to the floor or platform upon which the printing-press stands. The sprocket $b$ upon the outer end of said crank-shaft $f$ is connected by a link belt $h$ with sprocket $a$ on main shaft $e$ of printing-press, thus making connection between said treadle and press. The bolt-holes $i$ and $i'$ in braces $d$ and $d'$ and bolt-holes $j$ and $j'$ in foot of uprights $c$ and $c'$ are made oblong or slotted, so as to allow a sufficient movement to adjust said link belt $h$.

We do not claim as new or novel the double-crank-treadle movement, and are also aware of a double-treadle movement operating upon a double-crank main shaft of printing-press; but What we do claim as our invention, and desire to secure by Letters Patent, is—

In a foot-power, the combination of movable supports, a double-crank shaft mounted in said supports, a sprocket-wheel on the end of said shaft, brace-rods adapted to connect said supports with the frame of the driven machine, said rods being slotted at their outer ends and said supports having slotted bases whereby said supports may be adjusted toward or from the driven machine, substantially as described.

CHARLES E. FRALICK.
ORMOND C. FODREA.

Witnesses:
W. A. HIENBERGER,
J. G. GAWLEY.